(12) United States Patent
Wang et al.

(10) Patent No.: US 12,502,940 B2
(45) Date of Patent: Dec. 23, 2025

(54) FOLDING CAR COVER WITH SUPPORT BAR

(71) Applicant: Tony Waygong Chiu, Katy, TX (US)

(72) Inventors: Lizhao Wang, Katy, TX (US); Yi Lin, Katy, TX (US); Lei Lin, Katy, TX (US)

( * ) Notice: Subject to any disclaimer, the term of this patent is extended or adjusted under 35 U.S.C. 154(b) by 405 days.

(21) Appl. No.: 18/173,232

(22) Filed: Feb. 23, 2023

(65) Prior Publication Data

US 2024/0286470 A1 Aug. 29, 2024

(51) Int. Cl.
*B60J 7/14* (2006.01)
*B60J 7/19* (2006.01)

(52) U.S. Cl.
CPC ............... *B60J 7/141* (2013.01); *B60J 7/198* (2013.01)

(58) Field of Classification Search
CPC .................................. B60J 7/141; B60J 7/198
See application file for complete search history.

(56) References Cited

U.S. PATENT DOCUMENTS

| | | | | |
|---|---|---|---|---|
| 7,188,888 B2* | 3/2007 | Wheatley | ................. | B60J 7/141 292/256.73 |
| 8,511,736 B2* | 8/2013 | Williamson | ............ | E05C 19/14 224/558 |
| 8,960,765 B2* | 2/2015 | Facchinello | ............. | B60J 7/141 296/100.09 |
| 9,487,071 B1* | 11/2016 | Yue | .......................... | B60J 7/198 |
| 10,189,339 B2* | 1/2019 | Williamson | ............. | B60J 10/90 |
| 10,399,420 B2* | 9/2019 | Rossi | ........................ | B60J 7/198 |
| 10,414,254 B2* | 9/2019 | Zheng | ....................... | B60J 10/90 |
| 10,618,390 B1* | 4/2020 | Ma | ............................. | B60J 7/104 |
| 10,730,375 B2* | 8/2020 | Ma | ............................. | B60P 7/02 |
| 10,814,706 B2* | 10/2020 | Ma | ............................. | B60J 7/198 |
| 10,919,369 B2* | 2/2021 | Lewis | ....................... | B60J 7/104 |
| 10,960,745 B2* | 3/2021 | Dylewski, II | ............ | B60J 7/198 |
| 10,988,009 B1* | 4/2021 | Weng | ........................ | B60J 7/141 |
| 11,021,047 B2* | 6/2021 | Cai | ............................. | B60P 7/02 |
| 11,299,021 B2* | 4/2022 | Dylewski, II | ............ | B60J 7/198 |
| 11,331,990 B2* | 5/2022 | Carter | .................... | B60J 7/1607 |
| 11,407,294 B2* | 8/2022 | Shen | ......................... | B60J 7/141 |
| 11,890,921 B2* | 2/2024 | Qiu | ............................ | B60J 7/198 |
| 11,932,095 B2* | 3/2024 | Shen | ........................ | B60J 7/102 |
| 11,993,138 B2* | 5/2024 | Shen | ....................... | B60J 7/1607 |
| 12,024,002 B2* | 7/2024 | Chen | ........................ | B60L 8/003 |
| 12,157,356 B2* | 12/2024 | Fu | ............................. | B60J 7/141 |
| 12,251,997 B2* | 3/2025 | Qiu | ............................ | B60J 7/141 |
| 2021/0061078 A1* | 3/2021 | Cai | ............................ | B60J 7/198 |
| 2021/0061079 A1* | 3/2021 | Sun | ........................... | B60J 7/141 |
| 2023/0382208 A1* | 11/2023 | Wu | ............................ | B60J 7/141 |
| 2024/0174064 A1* | 5/2024 | Dylewski, II | ............ | B60J 7/141 |
| 2024/0198772 A1* | 6/2024 | Cai | ........................ | B60J 7/1607 |
| 2024/0217322 A1* | 7/2024 | Wu | ............................ | B60J 7/141 |
| 2024/0278629 A1* | 8/2024 | Liu | ........................... | B60J 7/198 |

(Continued)

*Primary Examiner* — Jason S Morrow

(57) ABSTRACT

A folding car cover comprises a front bar assembly, flipping plates, and a support bar system. The front bar assembly connects to a flipping plate assembly by a first rotating shaft system, while the flipping plates interconnect through a second rotating shaft system. The support bar system includes support bars and clamp blocks, with the support bars attached to the flipping plates and the clamp blocks secured to a car body. This configuration stabilizes the flipping plates during use without interfering with a guide rail's functionality.

8 Claims, 17 Drawing Sheets

(56) References Cited

U.S. PATENT DOCUMENTS

| | | | |
|---|---|---|---|
| 2024/0286470 A1* | 8/2024 | Wang | B60J 7/141 |
| 2024/0286473 A1* | 8/2024 | Liu | B60J 7/1607 |
| 2024/0300308 A1* | 9/2024 | Chen | B60J 7/141 |
| 2024/0416732 A1* | 12/2024 | Zheng | B60J 7/061 |
| 2025/0018777 A1* | 1/2025 | Gu | B60J 11/04 |
| 2025/0018778 A1* | 1/2025 | Zheng | B60J 7/198 |
| 2025/0050717 A1* | 2/2025 | Zheng | B60J 7/141 |

* cited by examiner

FOLDING CAR COVER WITH SUPPORT BAR

TECHNICAL FIELD

This utility model is relevant to automobile accessories, especially a folding car cover with support bar.

BACKGROUND TECHNOLOGY

The cargo hopper of a pick-up truck (also known as a sedan truck) is used to carry goods, as long as it is open, in order to avoid the rain from wetting the goods inside the cargo hopper in rainy and snowy weather, a new car cover is invented and installed on the cargo hopper of the pick-up truck, using the car cover to shelter the goods in the cargo hopper to avoid the goods inside from being wet by rain.

Although there are support bars on the existing car cover, one end of the support bar is connected to the flipping plate and the other end is connected to the guide rail. When using, the guide rail and the support bar are used to support the car cover. U.S. Pat. No. 9,815,358 discloses a car cover with support bars, which are supported through the guide rail.

About the Utility Model

The purpose of the utility model is to change the installation position of the support bar, so that the support bar is applicable to a wider range, and can be used with a variety of car covers.

In order to solve the above problems of the existing technology, the technical solution adopted in the utility model is as follows.

A folding car cover with support bars, including a front rail assembly, a flipping plate and a support bar system.

The front rail assembly is connected to the flipping plate by a first rotating shaft system, the flipping plates are connected to each other by a second rotating shaft system.

The support bar system includes a support bar and a support bar clamp block, the support bar and support bar clamp block are connected to the flipping plate and the car body respectively, the support bar system is used to support the flipping plate.

By connecting one end of the support bar system to the car body, the stability of the support can be well ensured and the support bar system does not interfere with the use of the guide rails when used.

By connecting one end of the support bar system to the car body, it is possible to fit essentially all car covers, even those come without their own guide rails, and are not limited by the guide rails.

Further, the first rotating shaft system includes a fixed section, a first rotating shaft section and a first intermediate bar, the fixed section is rotatably connected to the first intermediate bar by a first rotating shaft section, the fixed section is used to connect the front bar assembly and the first intermediate bar is used to connect the flipping plate. The first rotating shaft system is capable of 90° rotation and the second rotating shaft system is capable of 180° rotation, the second rotating shaft system includes a second intermediate bar, a second rotating shaft section and a third intermediate bar, the second intermediate bar and the third intermediate bar are respectively rotatably connected to the second rotating shaft section, both the second intermediate bar and the third intermediate bar are used to connect the flipping plate. Since the second rotating shaft system needs to be turned 180°, the second rotating shaft section is provided with an intermediate bar on each side, each of which can be rotated by 90° with respect to the second rotating shaft section, or the two intermediate bars can be made to rotate at different angles, or even so that one of the intermediate bars rotates by 180° and the other does not.

Further, the support bar system is provided with at least one, as the support bar system is used to support the flipping plate, normally one support bar system is sufficient, but for the sake of safety a plurality of support bar systems may be provided, the support bar is connected to the flipping plate connected to the front bar assembly, the support bar clamp block is connected to the car body, when the number of flipping plates is greater than two, the second rotating shaft section of the plurality of second rotating shaft systems varying in width, the support bar clamp block includes a clamp and a plastic block, the clamp is connected to the car body, the plastic block is connected to the clamp, the plastic block is provided with a U-shaped groove, the plastic block is connected to the clamp by a screw, the support bar is hinged to the flipping plate at one end, the other end of the support bar is detachable connected to the support bar clamp block, the end of the support bar connected to the support bar clamp block is provided with a support knob, the support bar is threaded with a nut.

Further, the clamp includes an inner clamp and an outer clamp, the inner clamp is connected to the outer clamp by a bolt, the outer clamp is provided with a clamp track, the plastic block is provided with a slide, the slide is provided with a threaded hole, the plastic block is connected to the clamp track by a screw. Here, through the cooperation of the inner clamp and the outer clamp, the clamp is connected to the car body in a stable way, then connect the plastic block to the clamp, connect the plastic block to the car body in a removable way, once the plastic block is damaged, the plastic block can be removed and replaced separately, which greatly reduces the maintenance cost. The clamp can also be used to clamp the guide rail, for the car cover with its own guide, clamps are generally used for connection, where they can either to clamp the guide rail or to connect the plastic block.

Further, the front bar assembly includes a front bar, a front bar fixing block and a front bar limiting block, the front bar limiting block is connected to the front bar, the front bar fixing block is connected to the car body by a clamp, the front bar fixing block is provided with a front bar limiting groove, the front bar limiting block is provided with a front bar limiting pole, the front bar limiting pole is inserted into the front bar limiting groove, the front bar limiting block is bolted to the front bar fixing block, here the clamp is of the same construction as that in the support bar, only used in a different place.

Further, it includes a lock bolt system, the lock bolt system includes a lock bolt connected to the flipping plate and a locking slider connected to the guide rail, the locking slider is connected to the car body by a screw, the locking slider is provided with a locking cylinder, the locking cylinder is used for limiting the lock bolt, the lock bolt system uses the locking slider for limiting, the traditional way of limiting the lock bolt is to make the whole side rail bigger, the same cross-section from the beginning to the end of the profile, this restriction structure makes a significant waste of material, whereas the locking slider is specifically designed for the position of the lock bolt and restricts only the lock bolt, reducing material costs.

Further, the lock bolt system includes a puller, a first lock bolt slot, a second lock bolt slot and a steel wire support block, the first lock bolt slot and second lock bolt slot are connected by a steel wire support block, the first lock bolt slot is slidingly connected with a lock bolt, the second lock bolt slot is slidingly connected with a lock bolt, the two lock bolts are connected by a steel wire, the steel wire passes through the steel wire support block, the steel wire is threaded with a puller, by setting the lock bolt system, the car cover can be opened simply by pulling the puller, the puller drives the locking bolt to contract through the steel wire, the first lock bolt slot and the second lock bolt slot are set on the plate body, both the production and installation of the two lock bolt slots are independent of each other, only connected through the steel wire support block.

The beneficial effects of the utility model are as follows. By setting up the support bar system, the cover can lift up, thus making full use of the space of the cargo hopper.

The utility model adds the support bar system on the basis of the original cover, using the support bar system can well adjust the opening degree of the cover to meet the loading needs of different goods.

The utility model connects one end of the support bar system to the car body, which can ensure the stability of the support and does not affect the use of the rail when the support bar system is used.

The utility model connects one end of the support bar system to the car body, which can be applied to all car covers, as well as to car covers without guide rails, not limited by the guide rails.

By adjusting the structure of the first rotation system, the utility model is able to drive the flipping plate to lift up, so that the cargo space can be adjusted according to the goods to be transported.

By improving the structure of the lock bolt system, the utility model uses the locking slider to limit the lock bolt and only installs it in the corresponding part of the lock bolt, reducing material costs.

Figure 1:
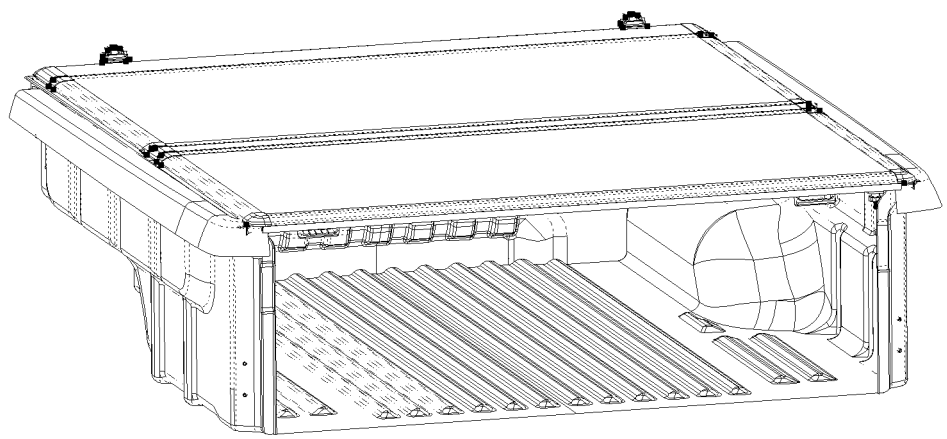
FIG. 1 is the installation schematic diagram 1 of car cover of the utility model.
Figure 2:
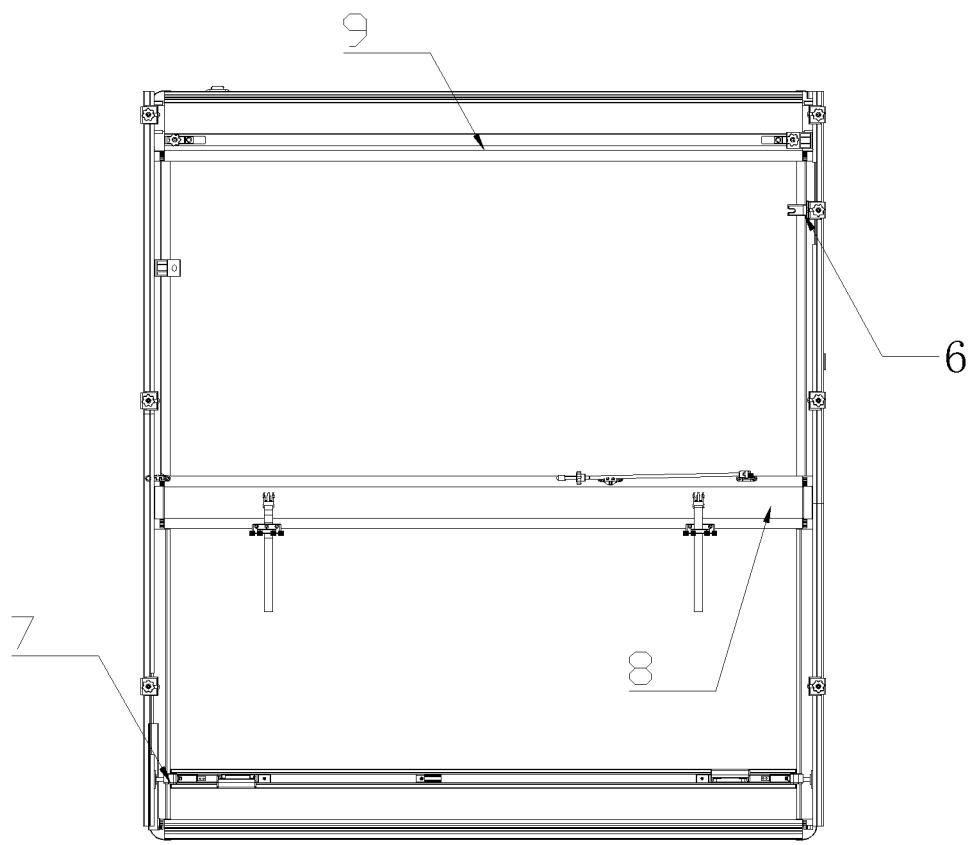
FIG. 2 is the structure schematic diagram 1 of car cover of the utility model.

In the picture: 32—Outer clamp, 3201—Clamp track, 33—Inner clamp, 3402—Screw hole, 3403—Slide groove, 35—Support bar, 3501—Nut, 3502—Support knob, 4—Front bar assembly, 41—Front bar fixing block, 4101—Front bar limiting groove, 42—Front bar limiting block, 4201—Front bar limiting pole, 6—Support bar clam block, 61—Car body, 62—Clamp, 63—Plastic block, 6301—U-shaped groove, 7—Lock bolt system, 71—Guide rail, 72—Locking slider, 73—Locking cylinder, 74—Lock bolt, 8—Second rotating shaft system, 81—Second intermediate bar, 82—Second rotating shaft section, 83—Third intermediate bar, 9—First rotating shaft system, 91—Fixing section, 92—First rotating shaft section, 93—First intermediate bar.

The Concrete Method to Carry Out

The following instruction further explains the utility model's concrete implementation method.

In order to enable a clearer understanding of the objects mentioned above, features and advantages of the present utility model, the utility model is described in detail below in connection with the accompanying drawings and specific embodiments. It should be noted that the embodiments of the present application and the features in the embodiments can be combined without conflict.

The terms "first", "second", "third", etc. are only used to differentiate the description and should not be construed as indicating or implying relative importance.

In the description of the utility model, it should also be noted that, unless otherwise expressly specified and limited, the terms "arranged," "installed," "connected," and "combined" should be understood in a broad sense. for example, it may be a fixing connection, it can also be a detachable connection or an integral connection. it can be a mechanical connection or an electrical connection. it can be a direct connection or an indirect connection through an intermediate media, and it can be internal connection within two assemblies. For those of ordinary skill in this field, specific meanings of the above terms in the present utility model can be understood in specific situations.

The specific embodiments of the present utility model will be described in detail below in connection with the accompanying drawings. It should be understood that the specific embodiments described herein are intended only to illustrate and explain the present utility model and not to limit it.

EMBODIMENT 1

As shown in FIGS. 1, 2, 6, 7 and 13, a folding car cover with support bars, including a front rail assembly 4, a flipping plate and a support bar system.

The front rail assembly 4 is connected to the flipping plate by a first rotating shaft system 9, the flipping plates are connected to each other by a second rotating shaft system 8.

The support bar system includes a support bar 35 and a support bar clamp block 6, the support bar 35 and support bar clamp block 6 are connected to the flipping plate 61 and the car body respectively, the support bar system is used to support the flipping plate.

By connecting one end of the support bar system to the car body 61, the stability of the support can be well ensured and the support bar system does not interfere with the use of the guide rails 71 when used.

EMBODIMENT 2

Figure 3:
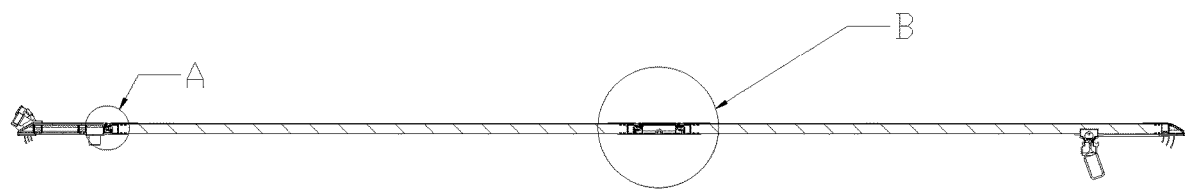
FIG. 3 is the structure schematic diagram 2 of car cover of the utility model.
Figure 4:
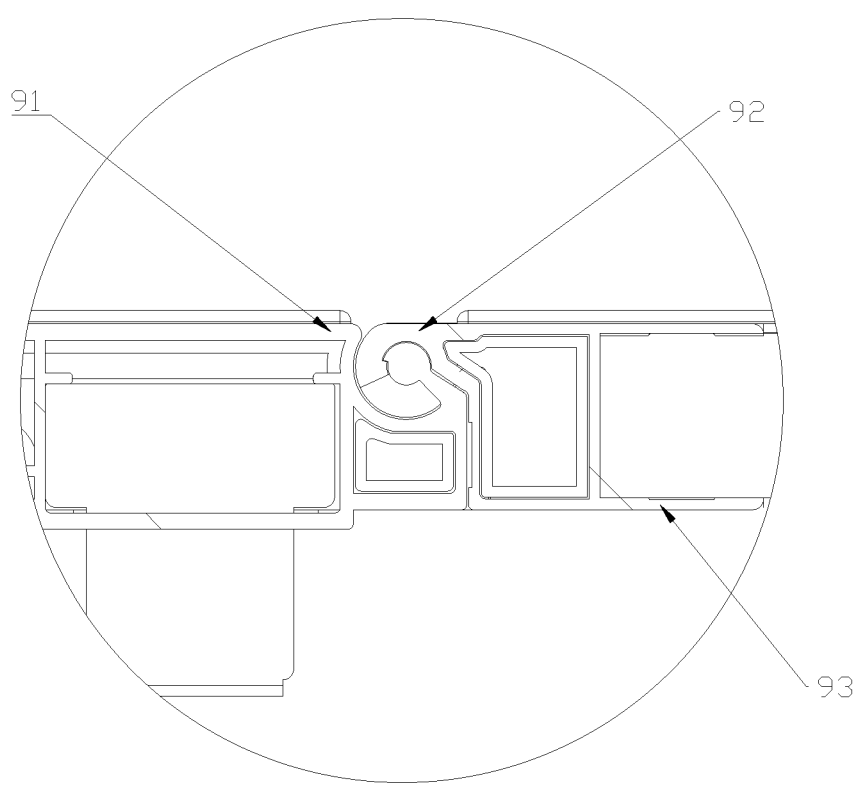
FIG. 4 is the partial enlarged view of part A in FIG. 3.
Figure 5:
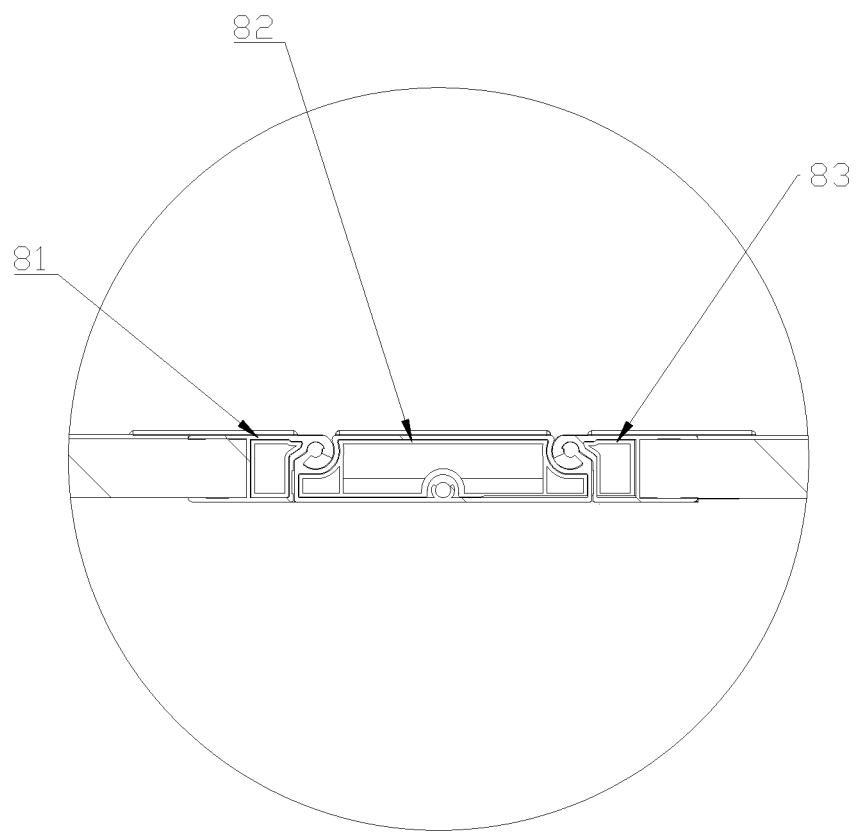
FIG. 5 is the partial enlarged view of part B in FIG. 3.
Figure 6:
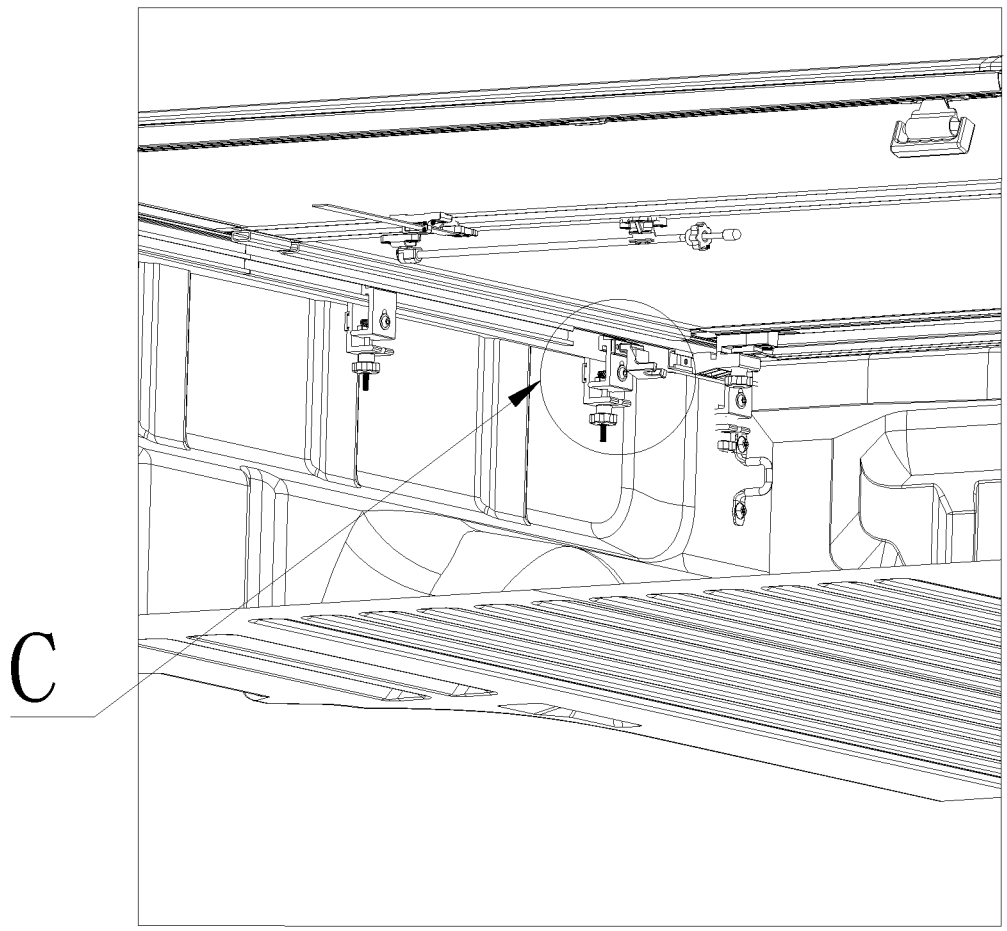
FIG. 6 is the installation schematic diagram of the clamp system.
Figure 7:
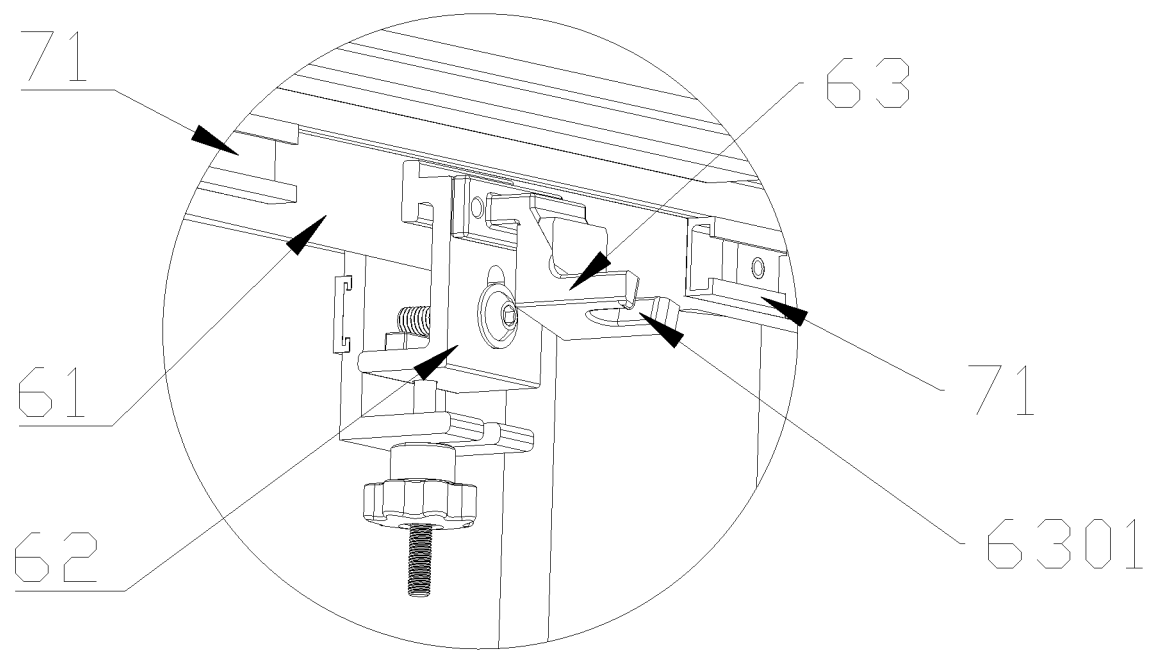
FIG. 7 is the partial enlarged view of part C in FIG. 6.
Figure 8:
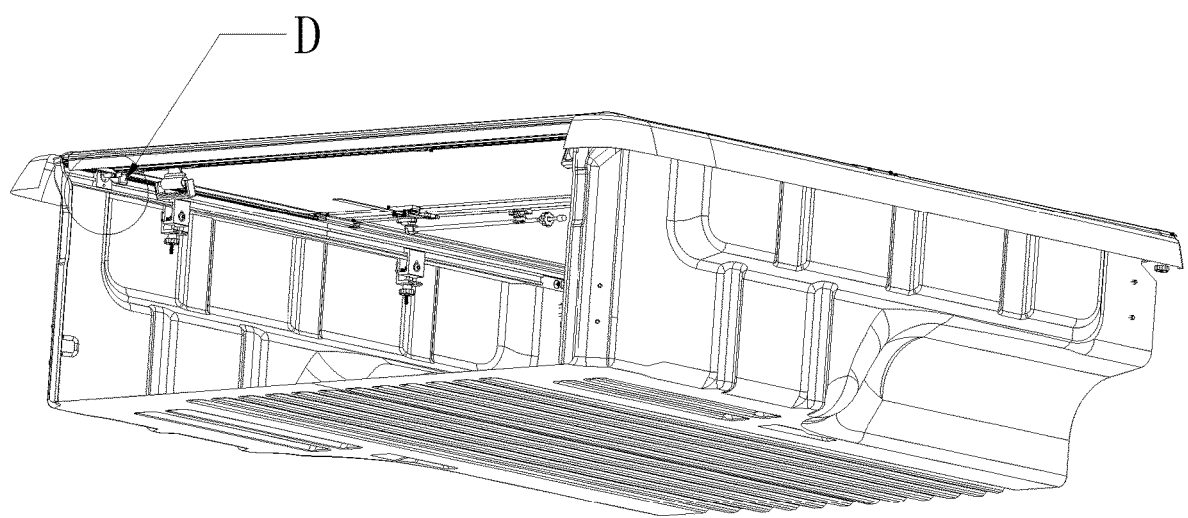
FIG. 8 is the installation schematic diagram 3 of car cover of the utility model.
Figure 9:
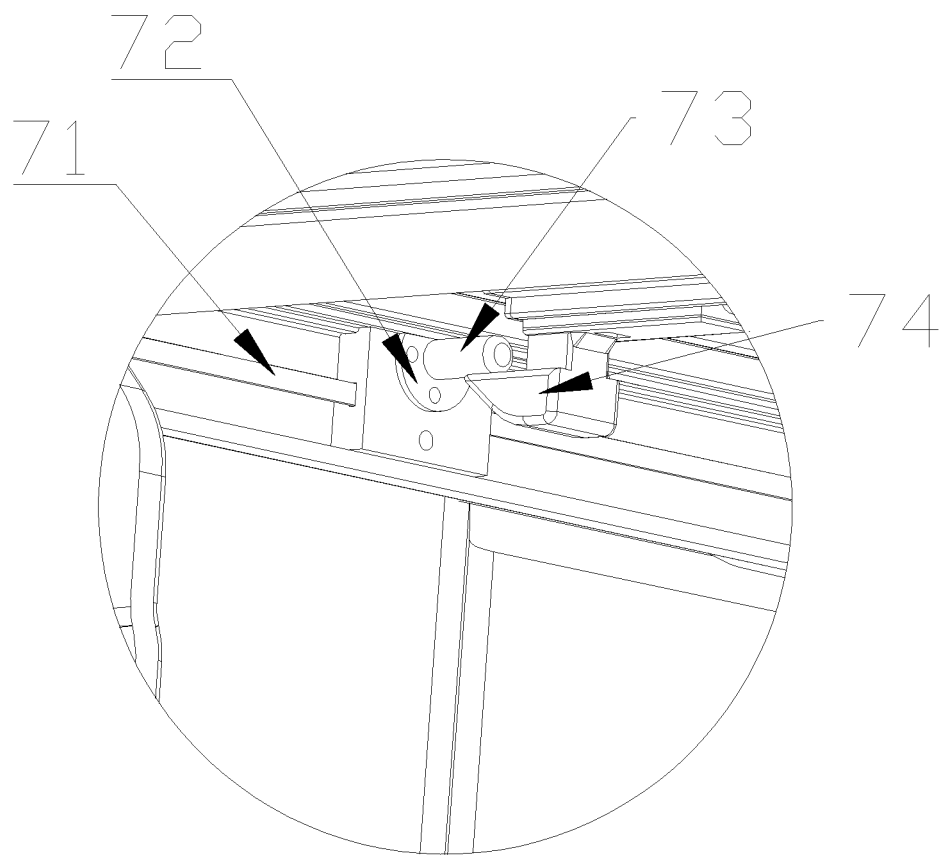
FIG. 9 is the partial enlarged view of part D in FIG. 8.
Figure 10:
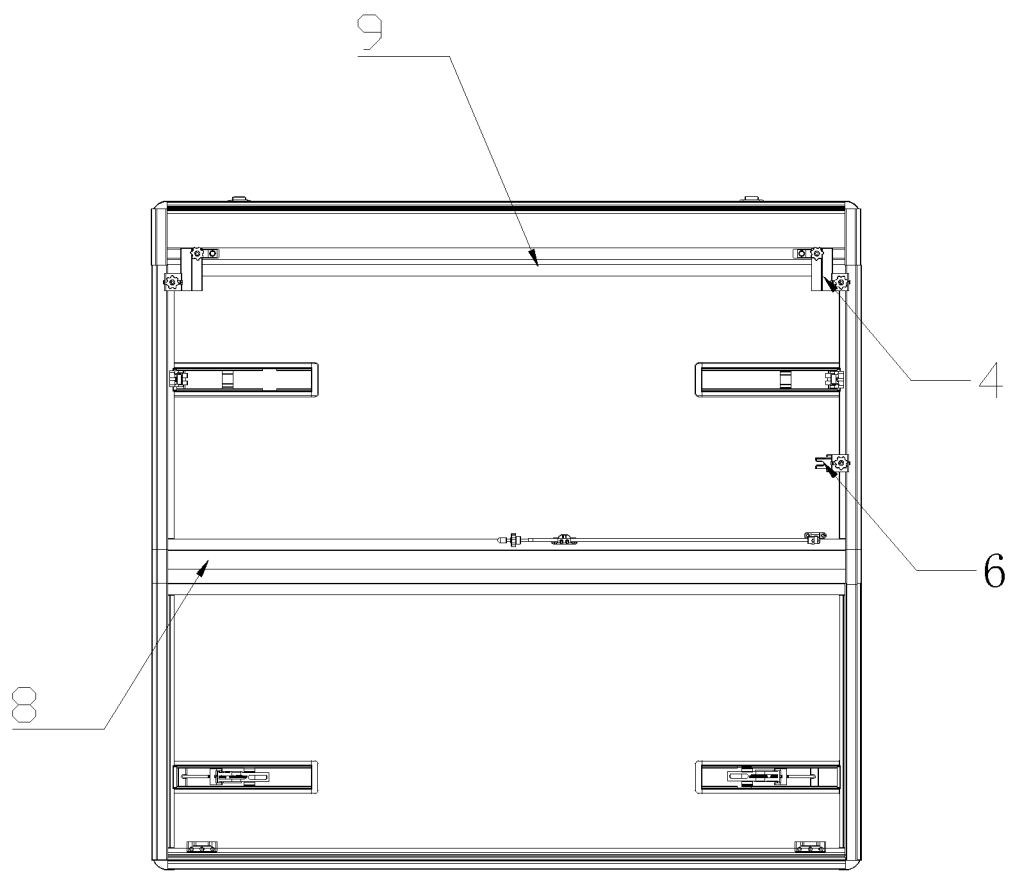
FIG. 10 is the structure schematic diagram 3 of car cover of the utility model.
Figure 11:
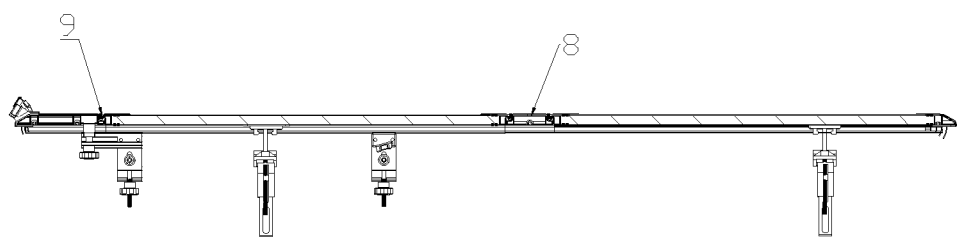
FIG. 11 is the structure schematic diagram 4 of car cover of the utility model.

On the basis of embodiment 1, as shown in FIGS. 3, 4 and 5, the first rotating shaft system 9 includes a fixed section 91, a first rotating shaft section 92 and a first intermediate bar 93, the fixed section 91 is rotatably connected to the first intermediate bar 93 by a first rotating shaft section 92, the fixed section 91 is used to connect the front bar assembly 4, the first intermediate bar 93 is used to connect the flipping plate.

The first rotating shaft system 9 is capable of turning 90° (not 90° in the absolute sense, but as long as it allows the flap to lift up), the second rotating shaft system 8 is capable of turning 180°. When in use, first turn the second rotating shaft system 8 so that all the flipping plates fall on the flipping plates closest to the front rail assembly 4, then the flipping plate connected to the front rail assembly 4 is turned over, after this flipping plate is lifting up, the flipping plate can be supported using the support bar system, which provides stable support and prevents the flipping plate from falling.

The second rotating shaft system 8 includes a second intermediate bar 81, a second rotating shaft section 82 and a third intermediate bar 83, the second intermediate bar 81 and the third intermediate bar 83 are respectively rotatably connected to the second rotating shaft section 82, both the second intermediate bar 81 and the third intermediate bar 83 are used to connect the flipping plate.

Since the second rotating shaft system 8 needs to be turned 180° (here 180° is not the standard 180°, but just as long as it enables the flipping plate to be flipped to the upper side of the other flipping plate). The second rotating shaft section 82 is therefore provided with an intermediate bar on each side, each of which can be rotated by 90° with respect to the second rotating shaft section 82, or the two intermediate bars can be made to rotate at different angles, or even so that one of the intermediate bars rotates by 180° and the other does not.

EMBODIMENT 3

Figure 12:
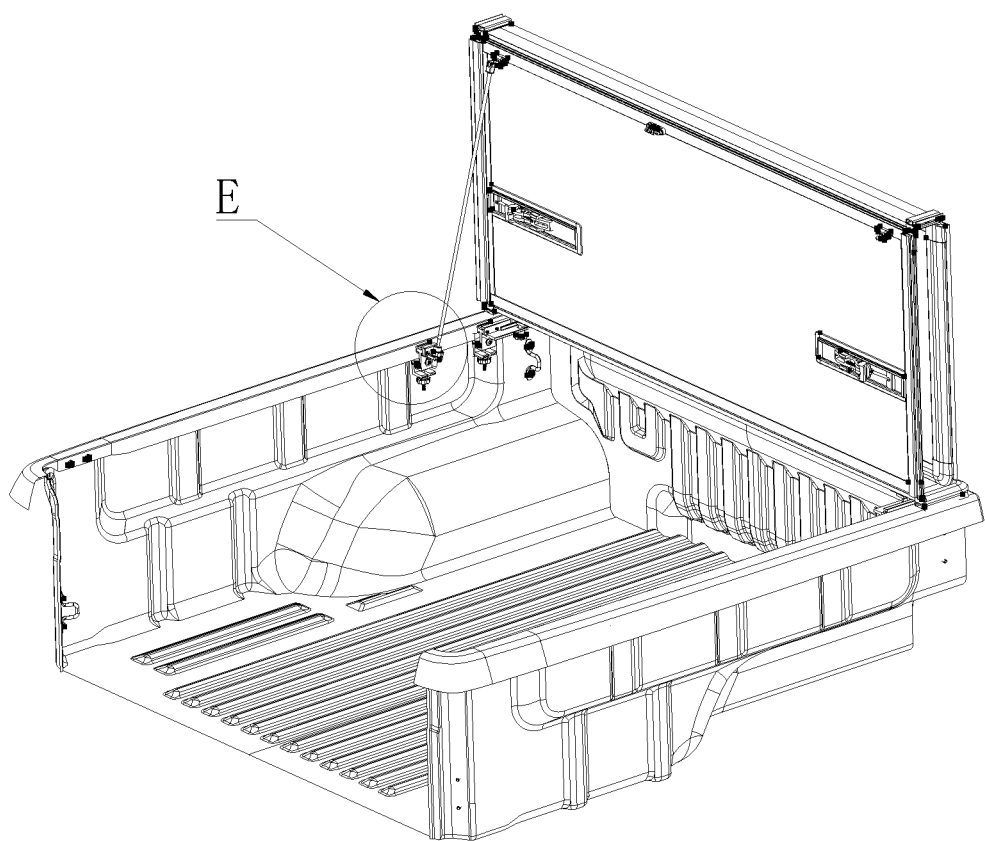
FIG. 12 is the opening diagram 1 of the front bar fixing system.
Figure 13:
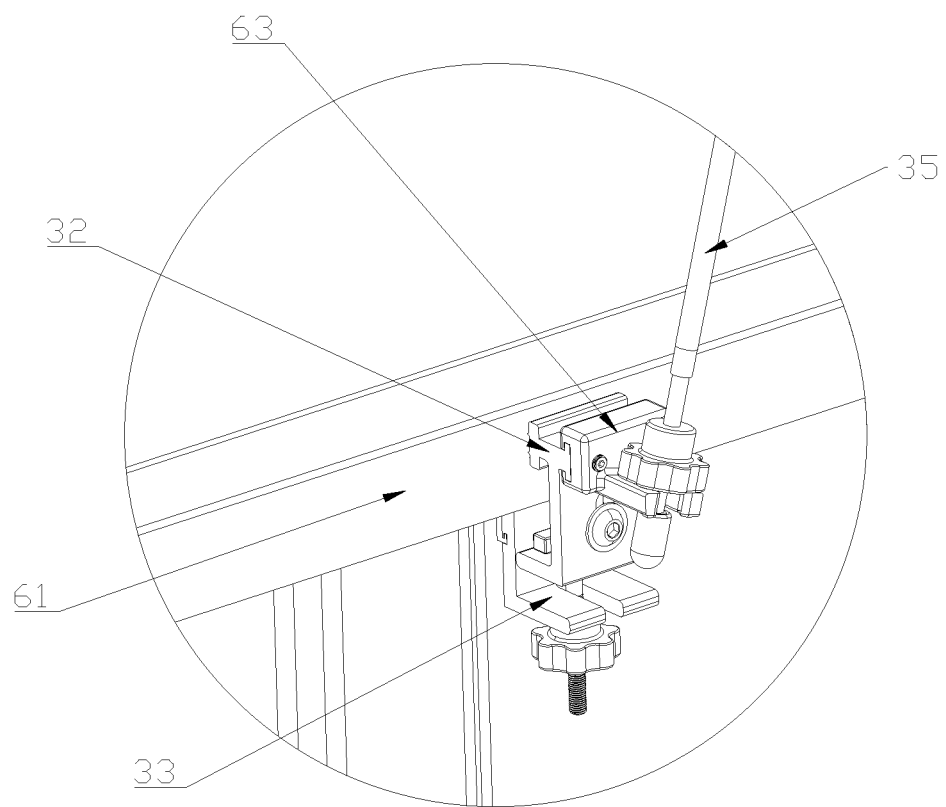
FIG. 13 is the partial enlarged view 1 of part E in FIG. 12.
Figure 14:
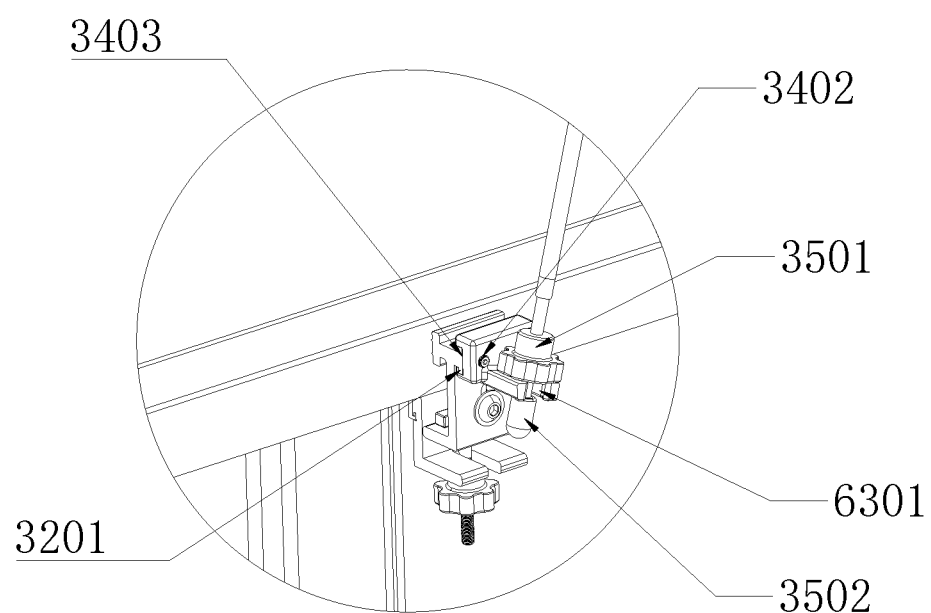
FIG. 14 is the partial enlarged view 2 of part E in FIG. 12.

On the basis of embodiment 2, as shown in FIGS. 12 and 14, the support bar system is provided with at least one.

As the support bar system is used to support the flipping plate, normally one support bar system is sufficient, but for the sake of safety a plurality of support bar systems may be provided.

The support bar 35 is attached to the flipping plate connected to the front bar assembly 4, the support bar clamp block 6 is connected to the car body 61.

When the number of flipping plates is greater than two, the second rotating shaft section 82 of the plurality of second rotating shaft systems 8 varying in width.

The support bar clamp block 6 includes a clamp 62 and a plastic block 63, the clamp 62 is connected to the car body 61, the plastic block 63 is connected to the clamp 62, the plastic block 63 is provided with a U-shaped groove 61.

The plastic block 63 is connected to the clamp 62 by a screw.

The support bar 35 is hinged to the flipping plate at one end, the other end of the support bar 35 is detachable connected to the support bar clamp block 6.

The end of the support bar 35 connected to the support bar clamp block 6 is provided with a support knob 3502, the support bar 35 is threaded with a nut 3501.

First connected the plastic block 63 to the car body 61 using the clamp 62, if the car body 61 is also connected with a guide rail 71, the guide rail 71 needs to be section, then skipping the support bar clamp block 6 and connecting the clamp 62 directly to the car body 61. If the car body 61 does not need to be fitted with guide rails 71, it is sufficient to connect the clamp 62 directly to the car body 61.

Secondly, the plastic block 63 can be connected to the guide rail 71 by the clamp 62 as required, the exact connection can be determined according to the actual installation conditions.

When supporting, one end of the support bar 35 is inserted into the U-shaped groove 6301 of the plastic block 63, so that the support knob 3502 and the nut 3501 are located on each side of the U-shaped groove 6301, the nut 3501 is used to support the plastic block 63 to form a solid support.

EMBODIMENT 4

On the basis of embodiment 3, as shown in FIGS. 8 to 11, the clamp 62 includes an inner clamp 33 and an outer clamp 32, the inner clamp 33 is connected to the outer clamp 32 by a bolt, the outer clamp 32 is provided with a clamp track 3201, the plastic block 63 is provided with a slide groove 3403, the slide groove 3403 is provided with a threaded hole 3402, the plastic block 63 is connected to the clamp track 3201 by a screw.

Here, through the cooperation of the inner clamp 33 and the outer clamp 32, the clamp 62 is connected to the car body 61 in a stable way, then connect the plastic block 63 to the clamp 62, and connect the plastic block 63 to the car body 61 in a removable way, once the plastic block 63 is damaged, the plastic block 63 can be removed and replaced separately, which greatly reduces the maintenance cost.

If it is required to connect the guide rail 71, it is also possible to connect the guide rail 71 by an inner clamp 33 and an outer clamp 32, when the clamp 62 is used to connect both the guide rail 71 and the plastic block 63.

EMBODIMENT 5

On the basis of embodiment 4, the front bar assembly 4 includes a front bar, a front bar fixing block 41 and a front bar limiting block 42, the front bar limiting block 42 is connected to the front bar, the front bar fixing block 41 is connected to the car body 61 by a clamp 62.

The front bar fixing block 41 is provided with a front bar limiting groove 4101, the front bar limiting block 42 is provided with a front bar limiting pole 4201, the front bar limiting pole 4201 is inserted into the front bar limiting groove 4101, the front bar limiting block 42 is bolted to the front bar fixing block 41.

Here the clamp is of the same construction as that in the support bar, only used in a different place.

If the clamp 62 can be positioned far enough forward, the front bar retaining block 41 and front bar limiting block 42 are not required and the front bar assembly 4 can be connected directly to the side rail or car body 61 by the clamp 62 and bolts, if the clamp 62 cannot be positioned far enough forward, the front bar limiting block 42 and front bar fixing block 41 will need to be added to connect the front bar to the car body 61.

EMBODIMENT 6

Figure 15:
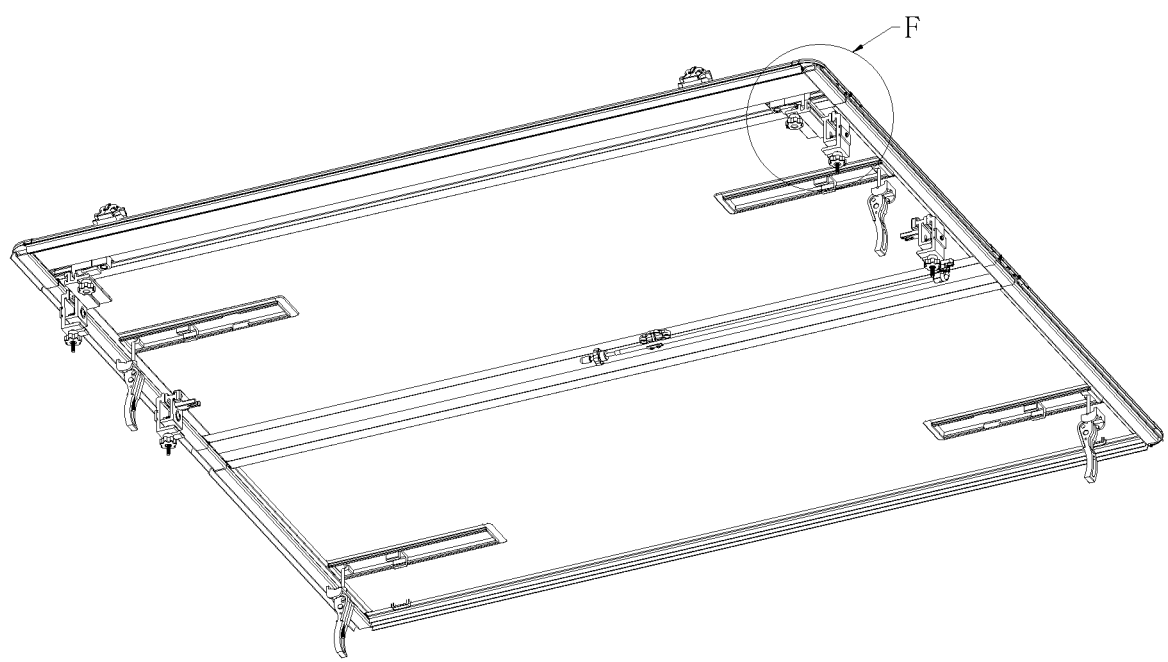
FIG. 15 is the structure schematic diagram 5 of car cover of the utility model.
Figure 16:
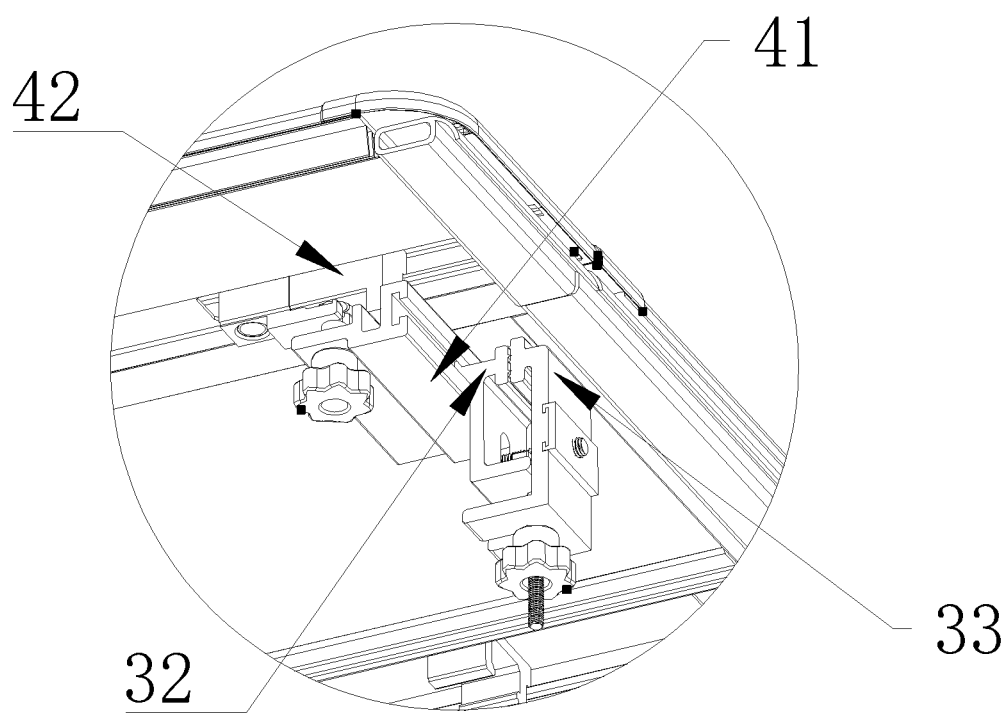
FIG. 16 is the partial enlarged view of part F in FIG. 15.
Figure 17:
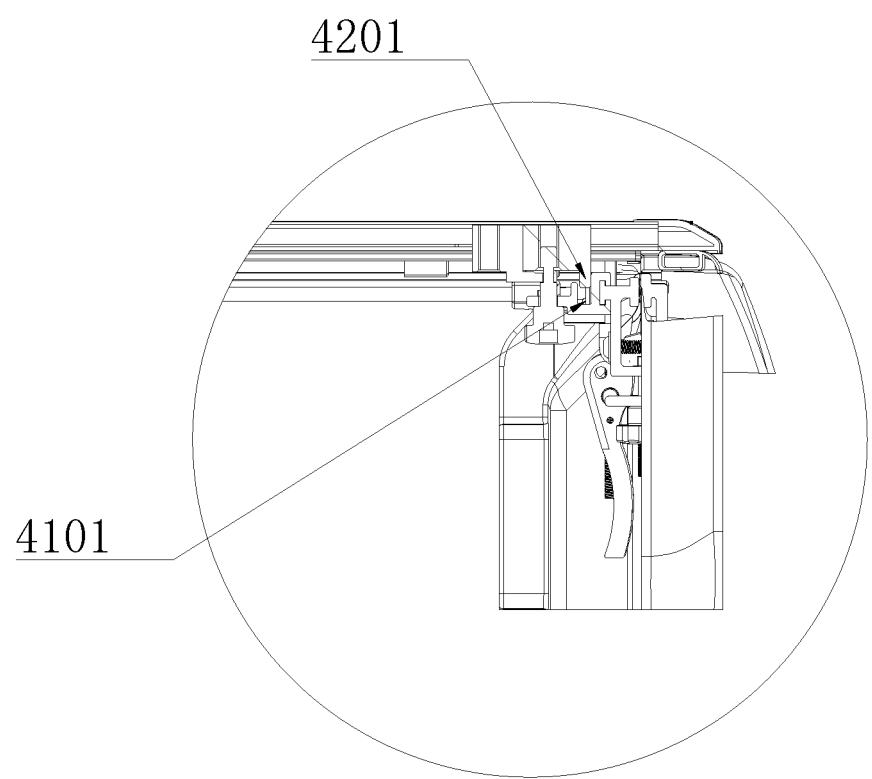
FIG. 17 is the connection schematic diagram of the front bar fixing system.

On the basis of embodiment 5, as shown in FIGS. 15 to 17, it further includes a lock bolt system, the lock bolt system includes a lock bolt 74 connected to the flipping plate 71 and a locking slider 72 connected to the guide rail 71, the locking slider 72 is connected to the car body 61 by a screw, the locking slider 72 is provided with a locking cylinder 73, the locking cylinder 73 is used for limiting the lock bolt 74.

The lock bolt system uses the locking slider 72 for limiting, the traditional way of limiting the lock bolt 74 is to make the whole side rail bigger, the same cross-section from the beginning to the end of the profile, this restriction structure makes a significant waste of material, whereas the locking slider 72 is specifically designed for the position of the lock bolt 74 and restricts only the lock bolt 74, reducing material costs.

The lock bolt system further includes a puller, a first lock bolt 74 slot, a second lock bolt 74 slot and a steel wire support block, the first lock bolt 74 slot and the second lock bolt 74 slot are connected by a steel wire support block, the first lock bolt 74 slot is slidingly connected with a lock bolt 74, the second lock bolt 74 slot is slidingly connected with a lock bolt 74, the two lock bolts 74 are connected by a steel wire, the steel wire passes through the steel wire support block. The steel wire is threaded with a puller, by setting the lock bolt system, the car cover can be opened simply by pulling the puller, the puller drives the locking bolt 74 to contract through the steel wire, the first lock bolt 74 slot and the second lock bolt 74 slot are set on the plate body, both the production and installation of the two lock bolt 74 slots are independent of each other, only connected through the steel wire support block.

The utility model is not limited to the above-mentioned optional embodiments, anyone can come up with various other forms of products under the inspiration of the utility model, however, regardless of any changes in its shape or structure, all technical solutions that fall within the scope defined by the claims of the present utility model shall fall within the scope of protection of the utility model.

The invention claimed is:

1. A folding car cover with support bars, comprising:
a front bar assembly (4);
a flipping plate assembly comprising a first flipping plate and a second flipping plate connected to each other by a second rotating shaft system (8);
a support bar system comprising a support bar (35) and a support bar clamp block (6);
a car body (61);
wherein the front bar assembly (4) is connected to the flipping plate assembly by a first rotating shaft system (9);
the support bar (35) is connected to the flipping plate assembly, and the support bar clamp block (6) is connected to the car body (61) for supporting the flipping plate assembly;
the support bar clamp block (6) includes a clamp (62) and a plastic block (63), the plastic block (63) is provided with a U-shaped groove (6301).

2. A folding car cover with support bars according to claim 1, wherein the first rotating shaft system (9) includes a fixed section (91), a first rotating shaft section (92) and a first intermediate bar (93), the fixed section (91) is rotatably connected to the first intermediate bar (93) by the first rotating shaft section (92), the fixed section (91) is used to connect to the front bar assembly (4), the first intermediate bar (93) is used to connect to the flipping plate.

3. A folding car cover with support bars according to claim 2, wherein: the second rotating shaft system (8) includes a second intermediate bar (81), a second rotating shaft section (82) and a third intermediate bar (83), the second intermediate bar (81) and the third intermediate bar (83) are respectively rotatably connected to the second rotating shaft section (82), both the second intermediate bar (81) and the third intermediate bar (83) are used to connect the flipping plate.

4. The folding car cover according to claim 1, wherein:
the support bar system is provided with at least one support bar (35);
the support bar (35) is attached to the flipping plate assembly adjacent to the front bar assembly (4);
the support bar clamp block (6) is mounted on the car body (61).

5. A folding car cover with support bars according to claim 1, wherein, the clamp (62) is connected to the car body (61), the plastic block (63) is connected to the clamp (62);
the plastic block (63) is connected to the clamp (62) by a screw;
the support bar (35) is hinged to the flipping plate at one end, the other end of the support bar (35) is detachable connected to the support bar clamp block (6), the end of the support bar (35) connected to the support bar clamp block (6) is provided with a support knob (3502), the support bar (35) is threaded with a nut (3501).

6. A folding car cover with support bars according to claim 5, wherein, the clamp (62) includes an inner clamp (33) and an outer clamp (32), the inner clamp (33) is connected to the outer clamp (32) by bolts, the outer clamp (32) is provided with a clamp track (3201), the plastic block (63) is provided with a slide groove (3403), the slide groove (3403) is provided with a threaded hole (3402), the plastic block (63) is connected to the clamp track (3201) by a screw.

7. A folding car cover with support bars according to claim 1, wherein the front bar assembly (4) includes a front bar, a front bar fixing block (41) and a front bar limiting block (42), the front bar limiting block (42) is connected to the front bar, the front bar fixing block (41) is connected to the car body (61) by a clamp (62);
the front rail fixing block (41) is provided with a front bar limiting groove (4101), the front bar limiting block (42) is provided with a front bar limiting rod (4201), the front bar limiting rod (4201) is inserted into the front bar limiting groove (4101), the front bar limiting block (42) is bolted to the front bar fixing block (41).

8. The folding car cover according to claim 1, further comprising:
a lock bolt system comprising:
a guide rail (71) mounted on the car body (61);
a lock bolt (74) connected to the flipping plate assembly;
a locking slider (72) slidably engaged with the guide rail (71) and secured to the car body (61) by a screw;
wherein the locking slider (72) includes a locking cylinder (73) configured to engage with the lock bolt (74) for position retention.

* * * * *